(12) United States Patent
Yokokawa et al.

(10) Patent No.: US 6,411,761 B1
(45) Date of Patent: Jun. 25, 2002

(54) OPTICAL FIBER CABLE

(75) Inventors: Tomoyuki Yokokawa; Yoshiyuki Suetsugu, both of Kanagawa; Hideyuki Iwata, Ibaragi, all of (JP)

(73) Assignees: Sumitomo Electric Industries, Ltd., Osaka; Nippon Telegraph and Telephone Corporation, Tokyo, both of (JP)

( * ) Notice: Subject to any disclaimer, the term of this patent is extended or adjusted under 35 U.S.C. 154(b) by 0 days.

(21) Appl. No.: 09/556,684

(22) Filed: Apr. 21, 2000

(51) Int. Cl.[7] .................................................. G02B 6/44
(52) U.S. Cl. ........................ 385/114; 385/102; 385/107; 385/113
(58) Field of Search .................... 385/100–114

(56) References Cited

U.S. PATENT DOCUMENTS 4,909,592 A * 3/1990 Arroyo et al. ............... 385/100
6,188,822 B1 * 2/2001 McAlpine et al. .......... 385/100

FOREIGN PATENT DOCUMENTS

JP          10-115755         5/1998

* cited by examiner

*Primary Examiner*—Cassandra Spyrou
*Assistant Examiner*—Fayez Assaf
(74) *Attorney, Agent, or Firm*—McDermott, Will & Emery

(57) ABSTRACT

The invention is to provide an optical fiber cable in which an end of an optical fiber core is prevented from being dragged inside the main cable body part upon the application of a tension on the optical fiber cable, and which prevents the increase in transmission loss and breakage of the optical fiber core caused by the movement of the optical fiber core near the connection point. The invention can be characterized in that an optical fiber cable is formed in such a manner that yarns are stranded in a periphery of the stack of the optical fiber ribbons, and an outer sheath of the main cable body part is formed with a tension member united thereto on the periphery of the yarns.

3 Claims, 4 Drawing Sheets

OPTICAL FIBER CABLE

BACKGROUND OF THE INVENTION

1. Field of the Invention

The present invention relates to an optical fiber cable equipped with a support wire used for an aerial line and the like.

2. Description of the Related Art

As a related art optical fiber cable, a structure comprising a support wire part and a main cable body part, which are continuously connected to each other, has been known, as described in Japanese Patent Laid-Open No. 115755/1998. FIG. 4A is a cross-sectional view showing an example of the related art optical fiber cable. In FIG. 4A, numeral 40 denotes an optical fiber cable, 41 denotes an optical fiber core forming an optical fiber ribbon stack, 42 denotes a hard resin covering for uniting the optical fiber ribbon stacks, 43 denotes an optical unit comprising the optical fiber core 41 and the hard resin covering 42, 44 denotes an outer sheath of a main cable body part covering the optical unit 43 in intimate contact therewith, 45 denotes a main cable body part, 46 denotes a tension member, 47 denotes an outer sheath of the tension member 46, 48 denotes a support wire part comprising the tension member 46 and the outer sheath 47 of the tension member 46, and 49 denotes a connecting part for connecting the cable main body part 45 and the support wire part 48. FIG. 4B is a side view showing the same optical fiber cable. The main optical fiber cable body part 45 is connected to the support wire part 48 in such a manner that the main cable body part meanders to have a slack with respect to the support wire part 48, and therefore when the optical fiber cable 40 is elongated on laying or by a strong wind, it is difficult to apply tension to the optical fiber core 41. However, an allowable elongating ratio is about 0.05% at most.

In order to fabricate an optical fiber cable that can be used under an environment in which strong tension is applied to the optical fiber cable, the larger slack should be given to the main cable body part with respect to the support wire part. For such a constitution, it is necessary that the main cable body part be connected to the support wire part through the connecting part with meandering on the surface thereof at a shorter interval. The constitution is not preferred from the standpoint of optical transmission characteristics, productivity and appearance, and also causes a problem in that the area receiving the wind is increased to further accelerate the elongating due to the wind pressure.

Under these circumstances, in an optical fiber cable, a practical amount of slack of the optical fiber main cable body part is limited to about 0.05% at most with respect to the support wire part.

Upon aerial laying of an optical fiber cable, a greater interval between the poles on which the optical fiber cable is hung, is required for decreasing the frequency of installation of the poles to reduce the operation of hanging the optical fiber. Therefore, an optical fiber is required to withstand strong tension applied by increasing the distance between the poles.

Along with the recent spread of optical communication networks, the amount of optical fiber cables laid aerially has also increased. Under these circumstances, there are often cases in that an additional optical fiber cable is laid with an optical fiber cable previously laid. Upon laying the additional optical fiber cable, there increase cases in that a ladder is set on the optical fiber cable, and the optical fiber cable is laid with strong tension being applied due to poor conditions of lying. Therefore, an optical fiber that can be used under stronger tension is required.

The related art optical fiber cable is constituted in such a manner that the optical fiber cores do not adhere to the inside of the hard resin covering, so as not to apply a local stress to the optical fiber core. In other words, the optical fiber cores are contained in the cable under the conditions which allows the optical fiber cores to move freely in the longitudinal direction in the cable. Accordingly, when the laid optical fiber cable is elongated, there arises a problem in that the optical fiber cores move in the longitudinal direction with respect to the outer sheath of the main cable body part, and an end of the optical fiber cores is dragged inside the main cable body part. In this case, there arises a problem where an excess length of the optical fiber core for joint is dragged inside to make the jointing operation difficult, and there are other problems where the jointed optical fiber core is broken by elongating, and the loss of transmission is increased by bending the optical fiber core in a small diameter. In the case where tension is temporarily applied to the optical fiber cable on setting a ladder or on laying operation, the dragged optical fiber core tends to return to the former state after releasing the tension, but the dragged optical fiber core is locally fixed due to the friction between the optical fiber core and the surroundings, causing the optical fiber core to buckle rather than return to the former state. In some other cases, such a fluctuation of the tension applied to the optical fiber cable causes the optical fiber core to move in the longitudinal direction in the optical fiber cable, resulting in dragging at one end and protruding at the other end.

SUMMARY OF THE INVENTION

An object of the invention is to provide an optical fiber cable with an end of an optical fiber core that prevents it from being dragged inside a main cable body part upon application of tension on the optical fiber cable, and that prevents the increase of transmission loss and breakage of the optical fiber core caused by movement of the optical fiber core near the connection point.

The invention relates to an optical fiber cable comprising a support wire part having a tension member, and a main cable body part, which are continuously connected to each other in a longitudinal direction, the main cable body part comprising a core comprising plural optical fiber cores, yarns stranded in a periphery of the core, and an outer sheath provided directly outside the yarns, and at least a part of the yarns being adhered to the outer sheath intermittently or continuously in the longitudinal direction.

In the optical fiber cable of the invention, it is preferred that a packing density of the yarns is adjusted to an amount which allows the optical fiber cores to exhibit a dragging amount of 30 mm or less upon the application of tension such that the optical fiber cable having a length of 80 m shows a elongating ratio of 0.2%.

It is also preferred that a packing density of the yarns is adjusted to an amount which allows the core to exhibit a withdrawing strength of 20 N or more upon application of tension such that the optical fiber cable having a length of 10 m shows a elongating ratio of 0.2%.

In the optical fiber cable of the invention, the core having the yarns stranded in the periphery thereof may be installed in a straight form in the outer sheath having a hollow shape, and the yarns may be installed in such a manner that when tension is applied to the optical cable, the yarns tighten the core to increase the withdrawing strength of the core.

According to the optical fiber cable of the invention, the breakage and increase in transmission loss caused by dragging the optical fiber core do not occur even under the conditions where the optical fiber cable shows a large elongating ratio of 0.2%, to ensure high reliability. Therefore, the invention provides advantages where the optical fiber cable can be laid between poles set apart at large intervals, and can be laid by high-speed traction, in which strong tension is applied to the optical fiber cable. Furthermore, in comparison to the related art optical fiber cable comprising an optical fiber core covered with a hard resin covering, the optical fiber core can be easily taken out after removing the outer sheath, to provide excellent operability of joint and processing of an end of the cable.

DESCRIPTION OF THE PREFERRED EMBODIMENTS

Figure 1:
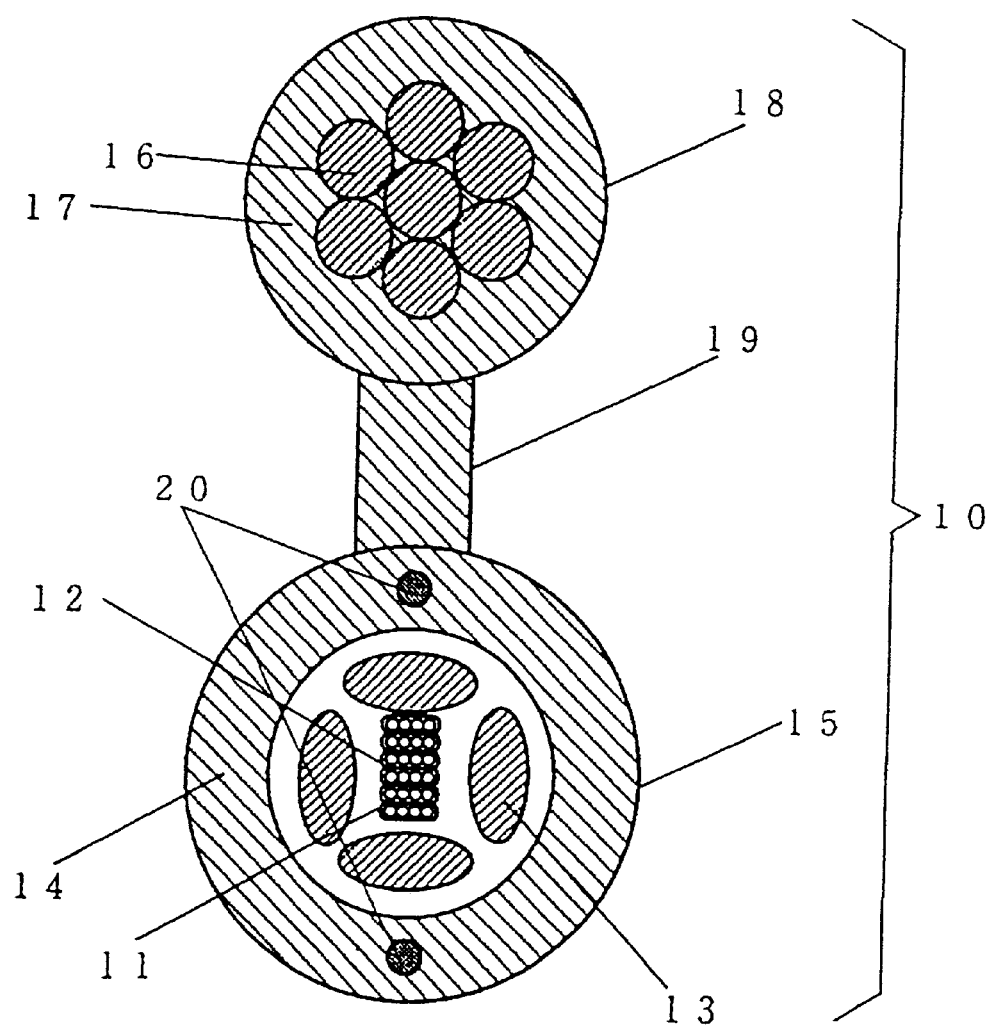
FIG. 1 is a cross-sectional view showing an embodiment of an optical fiber cable according to the invention.

FIG. 1 is a cross-sectional view showing an embodiment of an optical fiber according to the invention. In the figure, numeral 10 denotes an optical fiber cable, 11 denotes optical fiber ribbons, 12 denotes the stack of the optical fiber ribbons 11, 13 denotes yarns stranded in a periphery of the stack of the optical fiber ribbons, 14 denotes an outer sheath of a main cable body part covered on an outer periphery of the yarns 13, 15 denotes a main cable body part, 16 denotes a tension member, 17 denotes an outer sheath of the tension member 16, 18 denotes a support wire part comprising the tension member 16 and the outer sheath 17 of the tension member, and 19 denotes a connecting part for connecting the main cable body part 15 and the support wire part 18. Numeral 20 denotes a steel wire having a small diameter. Because the yarns 13 are wound on the stack of the optical fiber ribbons 12, and the outer sheath 14 of the main cable body part 15 is formed directly on the yarns 13 by extrusion molding, a part of the yarns 13 is in contact with the outer sheath 14 in a molten state to adhere thereto, and thus the yarns are not movable in the longitudinal direction with respect to the outer sheath 14 of the main cable body part 15.

In the state where no tension is applied to the optical fiber cable 10, the yarns 13 function as a cushioning layer for preventing the stack of the optical fiber ribbons 12 from direct contact with the outer sheath 14. In the state where no tension is applied to the optical fiber cable 10, the stack of the optical fiber ribbons 12 is held in the yarns 13 movably in the radial direction and the longitudinal direction, and when the optical fiber cable 10 is bent, the stack of the optical fiber ribbons 12 changes its position in the radial direction to prevent the stack of the optical fiber ribbons 12 from bending to a small diameter. In a state in which strong tension is applied to the optical fiber cable 10, on the other hand, the yarns 13 are elongated along with the optical fiber cable 10 since the yarns 13 are fixed to the outer sheath 14, and the yarns 13 tighten the stack of the optical fiber ribbons 12. The friction force between the stack of the optical fiber ribbons 12 and the yarns 13 is thus increased to restrict the movement of the stack of the optical fiber ribbons 12 with respect to the outer sheath 14.

The withdrawing strength of the stack of the optical fiber ribbons 12 on withdrawing the stack of the optical fiber ribbons 12 from the outer sheath 14 upon elongating the optical fiber cable 10 is determined by the extent of movability of the stack of the optical fiber ribbons 12 inside the main cable body part 15, which is determined by the material of the yarns 13, the packing density thereof in the main cable body part 15, and the stranding pitch thereof. Polypropylene yarns or polyethylene yarns are preferred as the yarns 13 used herein, from the standpoint of cost and stability of chemical and mechanical properties upon long term use. Because these yarns have similar chemical properties as polyethylene or polypropylene for constituting the outer sheath of the main cable body part, and have substantially the same melting point, the yarns can easily adhere to the outer sheath 14. In the case where a strong tightening strength is required, alamid fibers, such as Kevlar, nylon fibers or polyester yarns may be used as a mixture with the polypropylene yarns or the like described in the foregoing.

The relationship among the parameters of the stack of the optical fiber ribbons 12 and the yarns 13 stranded in the periphery thereof is studied and expressed by the following equation (I):

$$F = F0 + K \cdot (4 \cdot \pi^2 \cdot a^2 / (4 \cdot \pi^2 \cdot a^2 + p^2)) \cdot \epsilon \cdot d \cdot \mu \qquad (I)$$

In the equation, F represents a withdrawing strength per unit length of the stack of the optical fiber ribbons 12 when the optical fiber cable 10 is elongated; F0 represents a withdrawing strength per unit length of the stack of the optical fiber ribbons 12 before applying tension on the optical fiber cable 10; $\mu$ represents a friction coefficient between the stack of the optical fiber ribbons 12 and the yarns 13; a represents a diameter at the central part of the layer of the yarns 13; p represents a stranding pitch of the yarns 13; d represents a packing density of the yarns 13 expressed in terms of denier; and $\epsilon$ represents a elongating ratio of the optical fiber cable 10. K represents a constant depending on the material of the yarns 13. An unknown constant K can be obtained from the equation by evaluating at least two kinds of test samples, and the amount of the yarns 13 and the stranding pitch thereof required for obtaining the prescribed withdrawing strength of the stack of the optical fiber ribbons 12 can be obtained from the equation.

An example of the specific structure of the optical fiber cable according to the invention will be described with reference to FIG. 1. In the optical fiber cable 10, the tension member 16 was obtained by stranding seven steel wires having a diameter of 1.4 mm, and the optical fiber main cable body part 15 was formed with black polyethylene integrated with the connecting part 19 and the outer sheath 17 of the tension member 16. The outer sheath 14 of the main cable body part 15 had a cylindrical shape having an inner diameter of 5 mm and an outer diameter of 8 mm, and two thin steel wires having a diameter of 0.72 mm were buried in the outer sheath 14 of the main cable body part 15 along the cable axis on the line linking the center of the support wire part 18 of the outer sheath 14 and the center of the main cable body part 15. The thin steel wires 20 prevented the outer sheath 14 of the main cable body part 15 from shrinking upon forming the optical fiber cable by extrusion molding. In the main cable body part 15, the stack of the optical fiber ribbons 12 obtained by accumulating six optical fiber ribbons 11 having a width of 1.1 mm and a thickness of 3.3 mm, each of which was obtained by integrating four-cored optical fibers in the form of a tape, was installed at the center thereof, and the yarns 13 comprising polypropylene yarns were installed in the periphery of the core 12 by stranding at a pitch of 250 mm.

The inventors have studied the maximum practical tension that occurs. The strength of this type of optical fiber cable is borne by the support wire, and the support wire comprises a high-strength steel wire as a tension member from the standpoint of strength and economy. Because the high-strength steel wire exhibits non-reversible plastic deformation when it is elongated at 0.2% or more, the optical fiber cable should be designed so that the maximum elongating ratio becomes 0.2% or less. Considered conditions where such large elongating is applied, are those when the optical fiber cable suffering ice coating is blown by a strong wind, such as in the condition of 100 kg/mm$^2$ lateral wind pressure, which is equivalent to the cable installation in the strong wind of 40 m/sec wind velocity, and when a ladder is set upon it for maintenance of the cable. In the case where the optical cable is laid at a high speed among poles set apart at large intervals, such strong tension is also applied. Therefore, an optical cable shows the sufficient performance when the cable withstands the maximum elongating ratio of 0.2%.

Various measurement methods used in the following investigations will be described below. The withdrawing strength of the optical fiber core was measured in the following manner. An optical cable having a length of 10 m in a straight form was horizontally placed. A spring balance was connected to a core formed by accumulating the optical fiber cores in a state in which no external pressure was applied, and all the optical fiber cores were simultaneously withdrawn with the spring balance. The maximum tension occurring on withdrawing the whole length of the optical fiber cores was measured.

The dragging amount of the optical fiber core 12 was measured in the following manner. An optical fiber cable having a prescribed length, from both ends of which a core was exposed in a length of several tens centimeter, was horizontally placed in a straight form, which was designated as an initial condition. Tension was applied to the support wire of the optical fiber cable to elongate the cable at 0.2%. The dragging amounts of the optical fiber core at both ends of the cable were measured, and the larger one was designated as the dragging amount. The movement of the optical fiber core was larger near the part where the sheath had been removed to take out the optical fiber core, and became smaller with approaching the central part of the optical fiber cable. This is because friction occurred between the outer sheath of the cable and the yarns, and between the yarns and the stack of the optical fiber ribbons. Optical fiber cables having different lengths were subjected to elongating at 0.2%, and the dragging amount of the optical fiber core at the end of the cable was measured. As a result, the dragging amount was gradually increased by increasing the length of the optical fiber cable to 50 m, but it became substantially constant when the length of the cable exceeded 50 m. Accordingly, an optical fiber cable having a length of 80 m, which was sufficiently larger than the 50-m length, was used for the evaluation of the dragging amount.

The allowable dragging amount in the practical communication network has not been known. A connecting box called a closure is equipped at a connecting point of optical fiber cables, in which are housed a connecting point of optical fiber cores and the excess length of the optical fiber cores used for the connecting operation. The connecting box is generally designed to have a minimum size in order to prevent a large force applied to a messenger wire supporting the connecting box by a wind pressure particularly in the case of an aerial line. Accordingly, the connecting box generally has a length of about 50 cm, which is a length at which the minimum length of the optical fiber core needed to connect the optical fiber cores can be taken out from the optical fiber cable to be housed. Furthermore, the part housing the excess length is also designed to have as small size as possible, and has a structure such that the optical fiber core is wound on a drum having a diameter of 30 mm, which is the minimum diameter, by which the increase in transmission loss and mechanical deterioration do not occur in the optical fiber core.

Figure 3A:
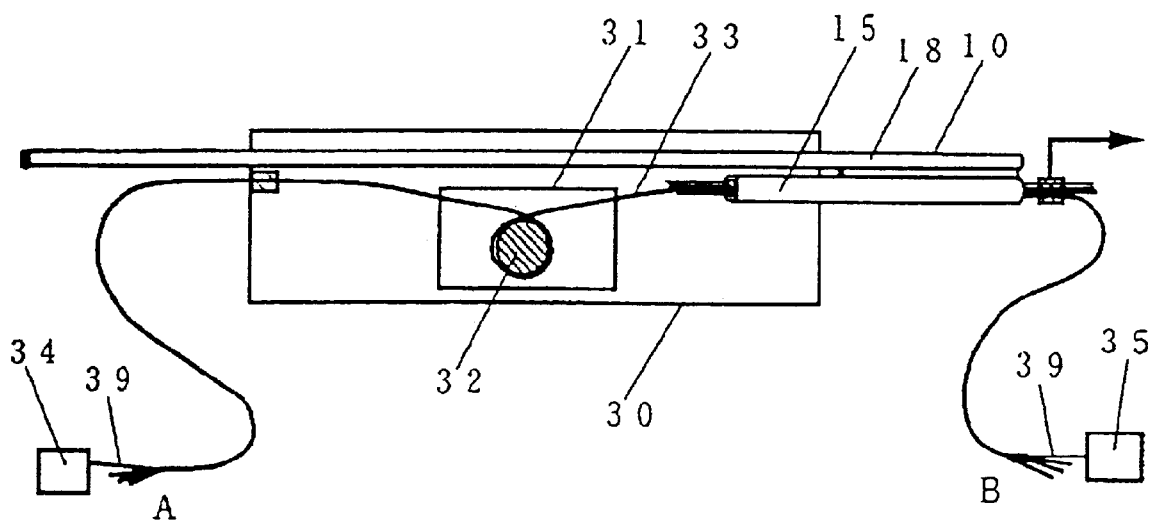
FIG. 3A is a diagram showing an equipment for evaluating the relationship between the dragging amount and the transmission characteristics of an embodiment of an optical fiber cable according to the invention.

By using an AO closure, which is known as one of the connecting boxes having the structure described above, increase in transmission loss in the 1.55 µm band was evaluated when dragging of the optical fiber core occurred. FIG. 3A is a diagram showing an equipment for the evaluation. According to the normal connecting operation, after fixing an optical fiber cable 10 to a connecting box 30, an optical fiber core 33 taken out from the end of the optical fiber cable 10, from which the cable was installed into the connecting box 30, was wound three times around a drum 32 provided inside a part housing the excess length 31 at the center of the connecting box 30, and then one end A of a single-cored optical fiber 39 in the optical fiber core 33 is connected to a light source 34 of a wavelength of 1.55 µm. Another optical fiber core 33 was taken out from the other end of the optical fiber cable 10 at the right-hand side of the figure, which was not fixed to the connecting box 30, and the other end B of the optical fiber 39, the end A of which had been connected to the light source, was connected to a light detector 35. The optical fiber core 33 was withdrawn along with other accumulated optical fiber cores to a prescribed length at the side of the light detector 35 on the optical fiber cable 10, so as to emulate the condition in that dragging occurred in the optical fiber core 33 in the connecting box 30.

Figure 3B:
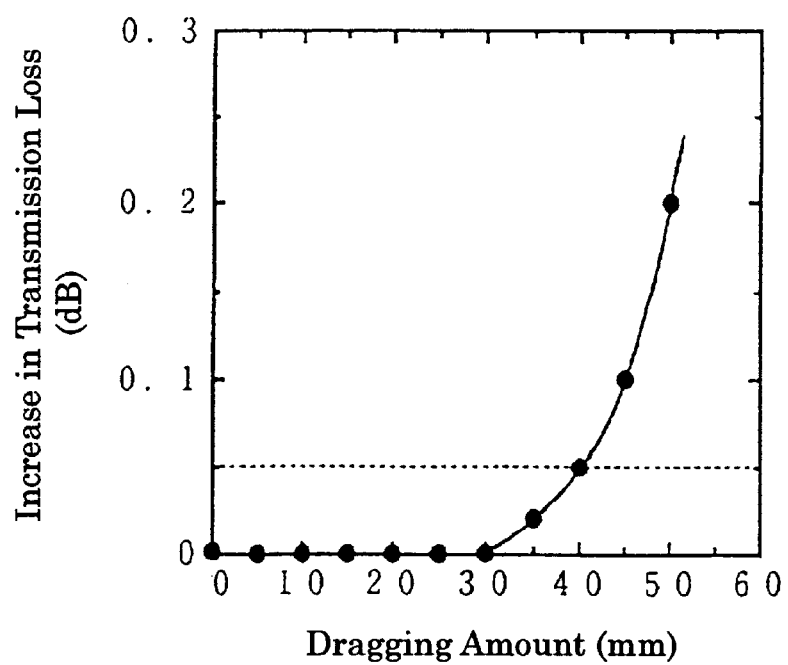
FIG. 3B is a graph showing the results of the evaluation.

The relationship between the dragging amount and the measurement result of increase in transmission loss is shown in FIG. 3B. When the dragging amount exceeded 30 mm, the slack of the optical fiber core in the periphery of the part housing the excess length is lost, and the optical fiber was pushed upon the drum to cause an increase in transmission loss. When the dragging amount exceeded 40 mm, considerable increase in transmission loss exceeding 0.05 dB was exhibited. It is understood from the results that the dragging amount of the optical fiber core is preferably 40 mm or less, and more preferably 30 mm or less.

On the contrary, the optical fiber core 33 at the end B was pushed into the optical fiber cable 10, and the occurrence of an increase in transmission loss was measured. When the pushing amount of the optical fiber core 33 was 30 mm or less, the pushed length was absorbed by the slack of the optical fiber core 33 in the connecting box 30 to cause no problem.

Four kinds of optical fiber cables were prepared for testing according to the example shown in FIG. 1 with changing the packing density of the yarns 13 comprising polypropylene yarns in the range of 8,000 to 28,000 deniers. The elongating ratio of 0.2% was applied to the optical fiber cables, and the withdrawing strength of the core was measured in the manner described in the foregoing. The results obtained agree well with the equation (I). Because the withdrawing strength of the stack of the optical fiber ribbons is proportional to the packing density of the yarns, the range of the withdrawing strength can be controlled by the packing density of the yarns.

Figure 2:
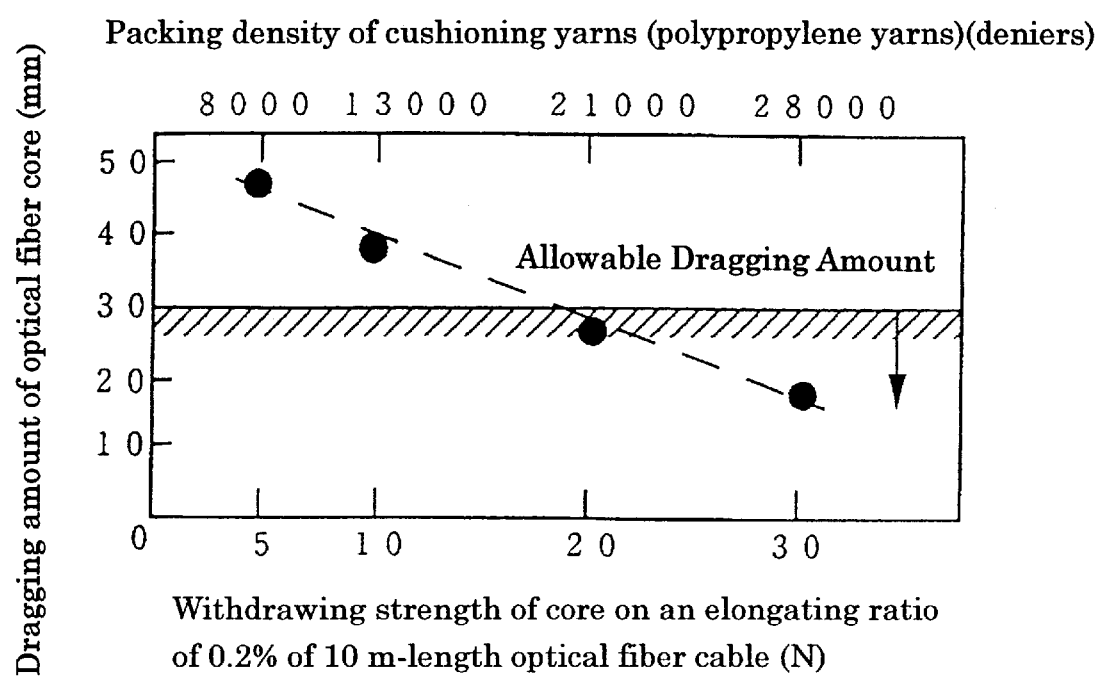
FIG. 2 is a graph showing the characteristics of the optical fiber cable according to the invention.

By using the optical fiber cables each having a length of 80 m, the dragging amount of the optical fiber core was measured in the manner described in the foregoing when tension providing an elongating ratio of 0.2% was applied to the optical fiber cable. FIG. 2 is a graph showing the relationship between the dragging amount of the optical fiber core when the elongating ratio of the optical fiber cable was 0.2% and the packing density of the yarns or the withdrawing strength of the stack of the optical fiber ribbons when the elongating ratio of the optical fiber cable was 0.2%. The results indicate that the withdrawing strength of the stack of the optical fiber ribbons and the dragging amount of the optical fiber core are in a proportional relationship to each other. Furthermore, it has been understood from FIG. 2 that in order for the dragging amount to be made 30 mm or less when the optical fiber cable is elongated to 0.2%, a withdrawing strength of the core of 20 N or more is required when the optical fiber cable having a length of 10 m is elongated to 0.2%. It has also been understood that the packing density of the yarns is made 21,000 deniers or more in order to obtain such a dragging amount.

Figure 4A:
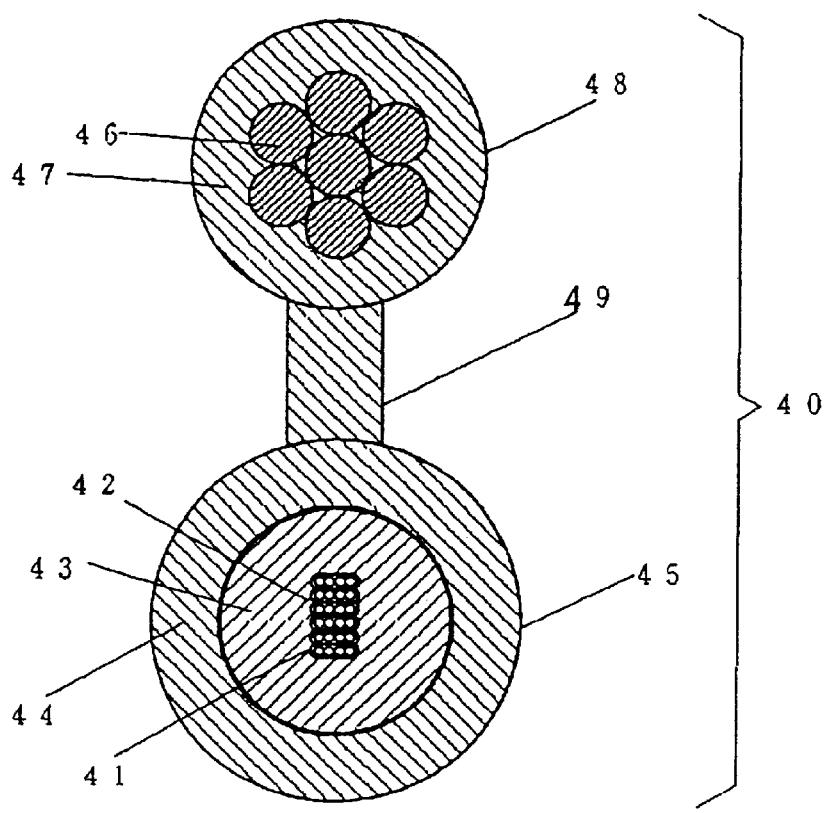
FIGS. 4A and 4B are a cross-sectional view and a side view, respectively, showing the structure of a related art optical fiber cable.
Figure 4B:
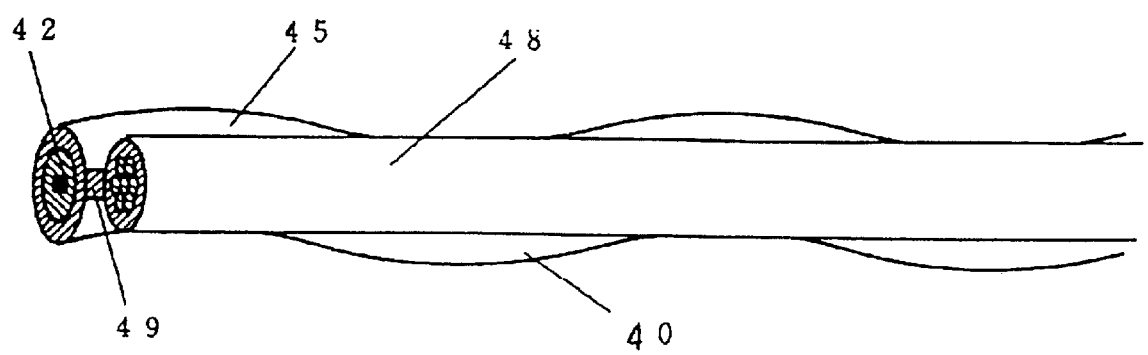

While the structure of the optical fiber cable 10, in which the main cable body part 15 is connected to the support wire part 18 without the slack, has been described, another structure may be employed, in which the main cable body part 15 is connected to the support wire part 18 with the slack as similar to the related art technique shown in FIGS. 4A and 4B, which is also one embodiment according to the invention. When such a structure is employed, because the elongating of the optical fiber cable, i.e., the elongating of the main cable body part with respect to the support wire, becomes small, the packing density of the yarns required for obtaining a dragging amount of the optical fiber core of 30 mm or less on an elongating ratio of the optical fiber cable of 0.2% can be small, and therefore, the productivity and the production cost are improved.

What is claimed is:

1. An optical fiber cable comprising a support wire part having a tension member, and a main cable body part, which are continuously connected to each other in a longitudinal direction, said main cable body part comprising a core comprising plural optical fiber ribbons, yarns stranded in a periphery of said core, and an outer sheath provided directly outside said yarns, and at least a part of said yarns being adhered to said outer sheath intermittently or continuously in said longitudinal direction, wherein the core having the yarns stranded in the periphery thereof is installed in a straight form in the outer sheath having a hollow shape, and the yams are installed in such a manner that when tension is applied to the optical cable, the yams tighten the core to increase the withdrawing strength of the core.

2. An optical fiber cable comprising a support wire part having a tension member, and a main cable body part, which are continuously connected to each other in a longitudinal direction, said main cable body part comprising a core comprising plural optical fiber ribbons, yarns stranded in a periphery of said core, and an outer sheath provided directly outside said yarns, and at least a part of said yarns being adhered to said outer sheath intermittently or continuously in said longitudinal direction, wherein a packing density of said yarns is adjusted to an amount in that said core exhibit a dragging amount of 30 mm or less upon the application of tension such that said optical fiber cable having a length of 80 m shows an elongating ratio of 0.2%.

3. An optical fiber cable comprising a support wire part having a tension member, and a main cable body part, which are continuously connected to each other in a longitudinal direction, said main cable body part comprising a core comprising plural optical fiber ribbons, yarns stranded in a periphery of said core, and an outer sheath provided directly outside said yarns, and at least a part of said yarns being adhered to said outer sheath intermittently or continuously in said longitudinal direction, wherein a packing density of said yarns is adjusted to an amount in that said core exhibit a withdrawing strength of 20 N or more upon the application of tension such that said optical fiber cable having a length of 10 m shows an elongating ratio of 0.2%.

* * * * *